US007099895B2

(12) United States Patent
Dempsey

(10) Patent No.: US 7,099,895 B2
(45) Date of Patent: Aug. 29, 2006

(54) SYSTEM AND METHOD FOR PERFORMING OBJECT ASSOCIATION USING A LOCATION TRACKING SYSTEM

(75) Inventor: Michael K. Dempsey, Westford, MA (US)

(73) Assignee: Radianse, Inc., Lawrence, MA (US)

( * ) Notice: Subject to any disclaimer, the term of this patent is extended or adjusted under 35 U.S.C. 154(b) by 562 days.

(21) Appl. No.: 10/096,187

(22) Filed: Mar. 11, 2002

(65) Prior Publication Data
US 2002/0145534 A1 Oct. 10, 2002

Related U.S. Application Data

(60) Provisional application No. 60/274,544, filed on Mar. 9, 2001.

(51) Int. Cl.
G06F 17/30 (2006.01)
(52) U.S. Cl. .................... 707/120; 707/10; 709/203; 709/219; 340/870.3
(58) Field of Classification Search ............... 707/10, 707/102, 104.1; 709/203, 219, 209, 213; 340/870.3, 870.5, 870.6, 870.7
See application file for complete search history.

(56) References Cited

U.S. PATENT DOCUMENTS

| 4,151,407 A | 4/1979 | McBride et al. ............. 250/199 |
| 4,225,953 A | 9/1980 | Simon et al. ................ 367/117 |
| 4,275,385 A | 6/1981 | White ......................... 340/312 |
| 4,462,022 A | 7/1984 | Stolarczyk ................... 340/506 |
| 4,471,345 A | 9/1984 | Barrett, Jr. ................... 340/572 |
| 4,495,496 A | 1/1985 | Miller, III .............. 340/825.54 |
| 4,549,264 A | 10/1985 | Carroll et al. .............. 364/406 |
| 4,598,272 A | 7/1986 | Cox ............................ 340/539 |
| 4,598,275 A | 7/1986 | Ross et al. ................... 340/573 |
| 4,601,064 A | 7/1986 | Shipley ....................... 455/608 |
| 4,649,385 A | 3/1987 | Aires et al. ................... 379/57 |
| 4,656,463 A | 4/1987 | Anders et al. .............. 340/572 |
| 4,682,155 A | 7/1987 | Shirley ........................ 340/573 |
| 4,709,330 A | 11/1987 | Yokoi et al. ................. 364/400 |
| 4,814,751 A | 3/1989 | Hawkins et al. ............ 340/573 |
| 4,868,859 A | 9/1989 | Sheffer ........................ 379/39 |

(Continued)

FOREIGN PATENT DOCUMENTS

WO WO 00/69198 A1 11/2000

(Continued)

OTHER PUBLICATIONS

Bahl, P. et al. RADAR: An in-building RF-based user location and tracking system. IEEE INFOCOM Tel-Aviv, Israel (Mar. 2000) pp. 775-784.

(Continued)

Primary Examiner—Leslie Wong
(74) Attorney, Agent, or Firm—Lahive & Cockfield, LLP; Anthony A. Laurentano, Esq.

(57) ABSTRACT

The present invention provides a method of recording object associations using a location system. Object locations are determined based on signals generated from object identifiers linked to the objects and forwarded to an electronic device interfaced with a network. Once the location of the object has been determined, the location determining module consults a database to determine associations between the located object and other objects or specified locations based on the other objects proximity to the located object. Once an association is determined, it is stored and the duration of the association is subsequently recorded. The data from the identified associations may then be leveraged in a number of ways as input data for a variety of applications, such as billing software, equipment utilization software, asset management software, and automatic event generation software.

36 Claims, 7 Drawing Sheets

U.S. PATENT DOCUMENTS

| | | | | |
|---|---|---|---|---|
| 4,906,853 A | 3/1990 | Linwood et al. | ............. | 250/551 |
| 4,916,444 A | 4/1990 | King | .................... | 340/825.49 |
| 4,924,211 A | 5/1990 | Davies | ........................ | 340/573 |
| 4,952,913 A | 8/1990 | Pauley et al. | ................ | 340/573 |
| 4,952,928 A | 8/1990 | Carroll et al. | .......... | 340/825.54 |
| 4,955,000 A | 9/1990 | Nastrom | ...................... | 367/117 |
| 4,958,645 A | 9/1990 | Cadell et al. | ................ | 128/903 |
| 4,982,176 A | 1/1991 | Schwarz | ...................... | 340/567 |
| 5,014,040 A | 5/1991 | Weaver et al. | ............... | 340/572 |
| 5,017,794 A | 5/1991 | Linwood et al. | ............. | 250/551 |
| 5,027,314 A | 6/1991 | Linwood et al. | ............. | 364/900 |
| 5,027,383 A | 6/1991 | Sheffer | ......................... | 379/39 |
| 5,062,151 A | 10/1991 | Shipley | ........................ | 359/154 |
| 5,103,108 A | 4/1992 | Crimmins | ................. | 250/338.1 |
| 5,119,104 A | 6/1992 | Heller | .......................... | 342/450 |
| 5,131,019 A | 7/1992 | Sheffer et al. | ................. | 379/39 |
| 5,194,856 A | 3/1993 | Zijlstra | ................... | 340/825.35 |
| 5,218,344 A | 6/1993 | Ricketts | ........................ | 340/573 |
| 5,228,449 A | 7/1993 | Christ et al. | ................ | 128/691 |
| 5,276,496 A | 1/1994 | Heller et al. | ................ | 356/141 |
| 5,283,549 A | 2/1994 | Mehaffey et al. | ........... | 340/521 |
| 5,301,353 A | 4/1994 | Borras et al. | ................... | 455/9 |
| 5,317,309 A | 5/1994 | Vercellotti et al. | ...... | 340/825.54 |
| 5,319,191 A | 6/1994 | Crimmins | ................. | 250/214 R |
| 5,355,222 A | 10/1994 | Heller et al. | ................. | 356/375 |
| 5,363,425 A | 11/1994 | Mufti et al. | ................... | 379/38 |
| 5,382,948 A | 1/1995 | Richmond | ............. | 340/825.36 |
| 5,387,993 A | 2/1995 | Heller et al. | ................. | 359/155 |
| 5,402,469 A | 3/1995 | Hopper et al. | ................ | 379/93 |
| 5,416,468 A | 5/1995 | Baumann | ..................... | 340/573 |
| 5,426,425 A | 6/1995 | Conrad et al. | .......... | 340/825.49 |
| 5,440,559 A | 8/1995 | Gaskill | ........................ | 370/95.1 |
| 5,455,851 A | 10/1995 | Chaco et al. | ................. | 379/38 |
| 5,458,123 A | 10/1995 | Unger | ......................... | 128/696 |
| 5,465,082 A | 11/1995 | Chaco | ................... | 340/825.54 |
| 5,479,408 A | 12/1995 | Will | .......................... | 370/94.1 |
| 5,485,634 A | 1/1996 | Weiser et al. | .............. | 455/53.1 |
| 5,493,283 A | 2/1996 | Hopper et al. | .......... | 340/825.34 |
| 5,493,692 A | 2/1996 | Theimer et al. | ............ | 455/26.1 |
| 5,512,879 A | 4/1996 | Stokes | ......................... | 340/573 |
| 5,544,321 A | 8/1996 | Theimer et al. | ....... | 395/200.11 |
| 5,548,637 A | 8/1996 | Heller et al. | ................ | 379/201 |
| 5,555,376 A | 9/1996 | Theimer et al. | ....... | 395/200.09 |
| 5,561,412 A | 10/1996 | Novak et al. | .......... | 340/286.07 |
| 5,570,079 A | 10/1996 | Dockery | ..................... | 340/541 |
| 5,572,195 A | 11/1996 | Heller et al. | ........... | 340/825.35 |
| 5,578,989 A | 11/1996 | Pedtke | ........................ | 340/539 |
| 5,594,786 A | 1/1997 | Chaco et al. | ................... | 379/93 |
| 5,603,054 A | 2/1997 | Theimer et al. | .............. | 395/826 |
| 5,610,589 A | 3/1997 | Evans et al. | ................. | 340/573 |
| 5,611,050 A | 3/1997 | Theimer et al. | ....... | 395/200.09 |
| 5,621,384 A | 4/1997 | Crimmins et al. | .......... | 340/539 |
| 5,627,517 A | 5/1997 | Theimer et al. | ............. | 340/572 |
| 5,633,875 A | 5/1997 | Hershey et al. | ............. | 370/346 |
| 5,673,032 A | 9/1997 | Ono | ........................ | 340/825.44 |
| 5,689,229 A | 11/1997 | Chaco et al. | .......... | 340/286.07 |
| 5,742,233 A | 4/1998 | Hoffman et al. | ............. | 340/573 |
| 5,774,876 A | 6/1998 | Woolley et al. | ............... | 705/28 |
| 5,790,974 A | 8/1998 | Tognazzini | ................. | 701/204 |
| 5,793,630 A | 8/1998 | Theimer et al. | ....... | 364/140.01 |
| 5,812,865 A | 9/1998 | Theimer et al. | ........ | 395/800 |
| 5,822,418 A | 10/1998 | Yacenda et al. | ............ | 379/201 |
| 5,822,544 A | 10/1998 | Chaco et al. | ............ | 395/202 |
| 5,826,195 A | 10/1998 | Westerlage et al. | ......... | 455/456 |
| 5,838,223 A | 11/1998 | Gallant et al. | .......... | 340/286.07 |
| 5,844,482 A | 12/1998 | Guthrie et al. | .............. | 340/568 |
| 5,903,373 A | 5/1999 | Welch et al. | ............... | 359/152 |
| 5,917,425 A | 6/1999 | Crimmins et al. | ..... | 340/825.49 |
| 5,929,848 A | 7/1999 | Albukerk et al. | | |
| 5,956,725 A | 9/1999 | Burroughs et al. | | |
| 5,977,913 A | 11/1999 | Christ | ........................ | 342/465 |
| 5,991,771 A | 11/1999 | Falls et al. | | |
| 6,009,333 A | 12/1999 | Chaco | ........................ | 455/456 |
| RE36,530 E | 1/2000 | Heller et al. | ................. | 359/155 |
| 6,011,487 A | 1/2000 | Plocher | ................... | 340/825.49 |
| 6,034,622 A | 3/2000 | Levine | ................... | 340/825.54 |
| 6,040,774 A | 3/2000 | Schepps | ................... | 340/572.1 |
| 6,075,433 A | 6/2000 | Ono et al. | ................... | 336/212 |
| 6,075,443 A | 6/2000 | Schepps et al. | ........... | 340/573.4 |
| RE36,791 E | 7/2000 | Heller | ........................ | 342/450 |
| 6,088,586 A | 7/2000 | Haverty | ....................... | 455/422 |
| 6,104,295 A | 8/2000 | Gaisser et al. | ............ | 340/573.4 |
| 6,122,520 A | 9/2000 | Want et al. | .................. | 455/456 |
| 6,150,921 A | 11/2000 | Werb et al. | ................. | 340/10.1 |
| 6,154,139 A | 11/2000 | Heller | ....................... | 340/573.4 |
| 6,154,676 A | 11/2000 | Levine | ........................ | 607/58 |
| 6,169,484 B1 | 1/2001 | Schuchman et al. | ..... | 340/573.1 |
| 6,175,308 B1 | 1/2001 | Tallman et al. | ............. | 340/539 |
| 6,211,790 B1 | 4/2001 | Radomsky et al. | ...... | 340/573.4 |
| 6,222,440 B1 | 4/2001 | Heller | ........................ | 340/10.3 |
| 6,222,484 B1 | 4/2001 | Seiple et al. | ........... | 342/357.09 |
| 6,236,335 B1 | 5/2001 | Goodwin, III | ......... | 340/825.49 |
| 6,237,051 B1 | 5/2001 | Collins | ........................ | 710/36 |
| 6,249,252 B1 | 6/2001 | Dupray | ....................... | 342/450 |
| 6,259,355 B1 | 7/2001 | Chaco et al. | .......... | 340/286.07 |
| 6,259,404 B1 | 7/2001 | Parl et al. | .................... | 342/457 |
| 6,281,811 B1 | 8/2001 | Ranzino | ..................... | 340/988 |
| 6,285,321 B1 | 9/2001 | Stilp et al. | .................. | 342/465 |
| 6,286,044 B1 | 9/2001 | Aoyama | ..................... | 709/223 |
| 6,292,744 B1 | 9/2001 | Want et al. | .................. | 701/207 |
| 6,317,082 B1 | 11/2001 | Bacon et al. | ............... | 342/465 |
| 6,317,604 B1 | 11/2001 | Kovach, Jr. et al. | ........ | 455/456 |
| RE37,531 E | 1/2002 | Chaco et al. | ................. | 379/38 |
| 6,344,794 B1 | 2/2002 | Ulrich et al. | ............... | 340/539 |
| 6,351,235 B1 | 2/2002 | Stilp | ...................... | 342/357.06 |
| 6,353,406 B1 | 3/2002 | Lanzl et al. | ................. | 342/118 |
| 6,373,389 B1 | 4/2002 | Przygoda, Jr. et al. | ... | 340/572.4 |
| 6,380,894 B1 | 4/2002 | Boyd et al. | ................. | 342/450 |
| 6,388,618 B1 | 5/2002 | Stilp et al. | .................. | 342/457 |
| 6,405,102 B1 | 6/2002 | Swartz et al. | ............... | 700/225 |
| 6,424,840 B1* | 7/2002 | Fitch et al. | ............... | 455/456.1 |
| 2001/0000958 A1 | 5/2001 | Ulrich et al. | ............... | 340/539 |
| 2001/0022558 A1 | 9/2001 | Karr, Jr. et al. | ............. | 342/450 |
| 2001/0035823 A1 | 11/2001 | Curwen et al. | .......... | 340/573.4 |
| 2001/0049629 A1 | 12/2001 | Freeman | ...................... | 705/23 |
| 2002/0039067 A1 | 4/2002 | Eubanks | ................... | 340/573.1 |
| 2002/0039080 A1 | 4/2002 | Wisherd et al. | ............. | 342/463 |
| 2002/0042278 A1 | 4/2002 | Crockett et al. | ............ | 455/456 |
| 2002/0044043 A1* | 4/2002 | Chaco et al. | .......... | 340/286.07 |
| 2002/0080759 A1 | 6/2002 | Harrington et al. | ......... | 370/338 |
| 2002/0086640 A1 | 7/2002 | Belcher et al. | ................ | 455/63 |
| 2002/0091659 A1* | 7/2002 | Beaulieu et al. | .............. | 706/62 |
| 2002/0094012 A1* | 7/2002 | Belcher | ....................... | 375/130 |
| 2002/0097182 A1 | 7/2002 | Goren et al. | ........... | 342/357.07 |
| 2002/0103674 A1* | 8/2002 | Reeder et al. | ................. | 705/3 |
| 2003/0030569 A1* | 2/2003 | Ulrich et al. | .......... | 340/825.49 |
| 2004/0143459 A1* | 7/2004 | Engleson et al. | ............... | 705/2 |

FOREIGN PATENT DOCUMENTS

| | | |
|---|---|---|
| WO | WO 01/15070 A2 | 3/2001 |
| WO | WO 01/15070 A3 | 3/2001 |
| WO | WO 01/29574 A2 | 4/2001 |
| WO | WO 01/29574 A3 | 4/2001 |
| WO | WO 01/33749 A1 | 5/2001 |
| WO | WO 01/35552 A1 | 5/2001 |
| WO | WO 01/95278 A1 | 12/2001 |

OTHER PUBLICATIONS

Borriello, G. et al. Embedded computation meets the world-wide web. Submitted to Communications of the ACM, Dec. 1999. http://www.nano.xerox.com/want/vita.htm#Publications.

Bulusu, N. et al. GPS-less low-cost outdoor localization for very small devices. University of Southern California. IEEE Personal Communications (Oct. 2000) pp. 28-34.

Castro, P. et al. A probabilistic room location service for wireless networked environments. (Oct. 16, 2001) pp. 18-34 http://link.springer.de/link/service/series/0558/bibs/2201/22010018.htm.

Chakraborty, A. A distributed architecture for mobile, location-dependent applications. MIT Master's thesis. Computer Science and Engineering (May 2000).

Dertouzos, M. The future of computing. Scientific American (Aug. 1999) p. 1-6.

Gibbs, W. As we may live. Scientific American (Nov. 2000) pp. 39-40.

Girling, G. et al. The design and implementation of a low power ad hoc protocol stack. ATT Laboratories Cambridge. http://www.uk.research.att.com:/pub/docs/att/tr.2000.13.pdf (Sep. 2000).

Harter, A. et al. A distributed location system for the active office. (Nov. 1993) pp. 1-17 Olivetti Research Limited, Cambridge England. http://www.uk.research.att.com/pub/docs/att/tr.94.1.pdf.

Harter, A. et al. The anatomy of a context-aware application. Proc. ACM/IEEE MOBICOM Seattle, WA. (Aug. 1999) pp. 59-68.

Hightower, J. Investigating an indoor 3D location sensing technology based on RF signal strength. Ph.D. Qualifying Exam Presentation for the University of Washington (Dec. 8, 1999) slides 1-23; pp. 1-12 http://www.cs.washington.edu/homes/jeffro/pubs/spoton_quals99/spoton_quals99.pdf.

Hightower, J. et al. SpotON: An indoor 3D location sensing technology based on RF signal strength. UW CSE Technical Report #2000-02-02, University of Washington, Seattle, WA (Feb. 18, 2000) pp. 1-16.

Hopper, A. The Royal Society Clifford Paterson Lecture (1999) Sentient computing. pp. 1-10 http://www.uk.research.att.com/pub/docs/att/tr.1999.12.pdf.

Priyantha, N. et al. The cricket location-support system. 6th ACM International Conference on Mobile Computing and Networking (ACM MOBICOM), Boston, MA (Aug. 2000).

Want, R. et al. Personal interactive computing objects. Olivetti Research Ltd. Cambridge, England. (May 26, 1999) http://www.uk.research.att.com/pub/docs/att/tr.92.2.pdf.

Want, R. et al. The active badge location system. ACM Transactions on Information Systems 10 (Jan. 1992) pp. 91-102.

Want, R. et al. An overview of the PARCTAB ubiquitous computing experiment. IEEE Personal Communications (Dec. 1995) 2(6):28-43.

Want, R. et al. Activating everyday objects. Proceedings of the 1998 DARPA/NIST Smart Spaces Workshop, NIST, Gaithersburg, Maryland (Jul. 30-31, 1998) pp. 7-140-7-143.

Want, R. et al. Bridging physical and virtual worlds with electronic tags. Proceeding of ACM SIGCHI (May 1999) Pittsburgh pp. 370-377.

Want, R. et al. Ubiquitous electronic tagging. Submitted to IEEE Concurrency, Dec. 1999 pp. 1-6 http://www.nano.xerox.com/want/papers/ubitags-con-2000R1.pdf.

Ward, A. et al. A new location technique for the active office. IEEE Personal Communications (Oct. 1997) 4(5):42-47.

Weatherall, J. et al. Predator: A distributed location service and example applications. ATT Laboratories Cambridge England. (Sep. 16, 1999) pp. 1-14 http://www.uk.research.att.com/pub/docs/att/tr.1999.5.pdf.

* cited by examiner

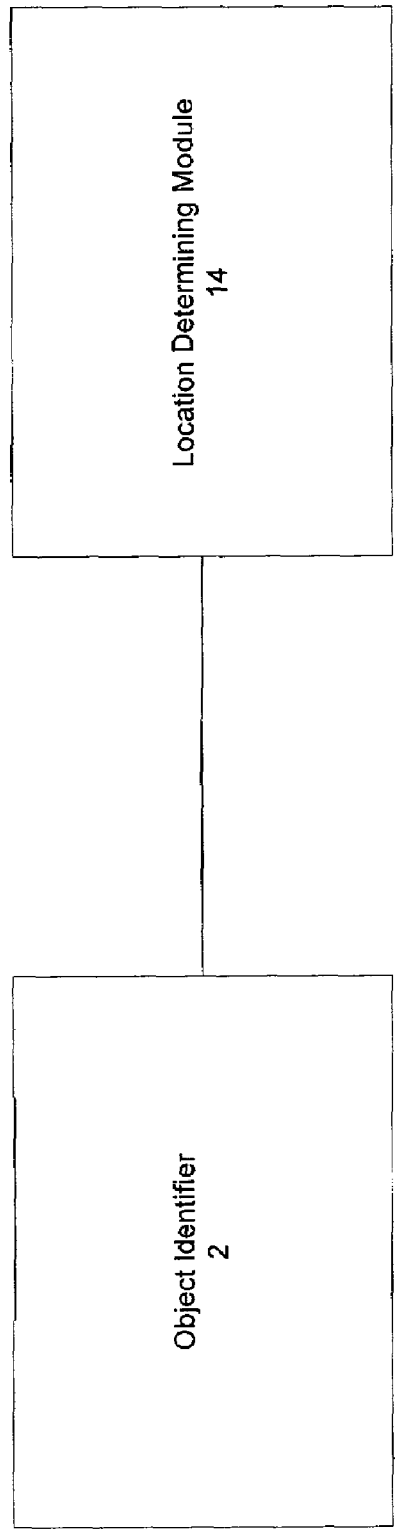

SYSTEM AND METHOD FOR PERFORMING OBJECT ASSOCIATION USING A LOCATION TRACKING SYSTEM

REFERENCE TO RELATED APPLICATIONS

The present invention claims priority to a U.S. Provisional Patent Application, Ser. No. 60/274,544, filed Mar. 9, 2001, entitled Location System and the contents of that application are incorporated by reference herein.

FIELD OF THE INVENTION

The illustrative embodiment of the present invention relates generally to a location tracking system and more particularly to performing object association using a location tracking system.

BACKGROUND

There is a need to automatically and accurately track the amount of time a person or object spends interacting or associating with other people or objects. This association information may be used for accounting purposes, for worker payroll, to bill a customer, or to log the "work expended" on a given object or by a given person. Alternatively, the information may be used for inventory records, equipment utilization studies, event precipitation and similar uses. Unfortunately, the accuracy of today's object association systems is inadequate. Conventional object association systems require estimates to capture the amount of time devices spend interacting. For example, it is quite common to estimate the amount of time that an expensive piece of medical equipment was used during a procedure. Since medical equipment can generate millions of dollars a year in bills corresponding to the time the equipment is operated, a small inaccuracy in estimation of the time of operation has a big impact on either the payer or the payee. Accordingly, it is becoming more common for medical insurance companies to demand exact time recordings of the usage of particular equipment. Since this requires human oversight, the process becomes very burdensome for the medical staff.

The need for humans to initiate conventional object association systems represents a major difficulty with the systems. This requirement for manual interaction, typically to start and stop timers or record times, results in inaccurate readings that can be subject to fraud. Some people simply forget to start or stop the timers, especially when they have multiple tasks to perform, or they just estimate the time to keep things simpler. In most cases they do not stop the timers when they take small breaks and this leads to inaccurate readings. In some cases, people start or stop the time tracking system fraudulently which results in inaccurate billing. Additionally, tracking the time that objects spend interacting is not possible since the objects, absent an interface with a timer, can not start a timer, a person needs to be involved in some way. Unfortunately conventional association systems are not designed to determine and log associations automatically without human intervention.

Conventional object association systems fail to track multiple tasks, either sequentially or simultaneously. In "time clock" type systems, if there are multiple objects or tasks to be tracked there must be multiple timers. These timers can track when a human operator notes that two devices begin to interact, but the problem rapidly becomes too complex to record if there are multiple devices interacting with other devices. Conventional wireless tether systems are limited to noting when two devices are close to each other, they can not deal with multiple interactions starting and stopping. The location system solutions simply show that multiple devices are in the same space, they do not show which is interacting with another nor the times of these interactions as they have difficulty in determining interaction detail. Additionally, most current systems do not have the ability to automatically and continuously track object interactions, such as tracking the progress of a piece of work in process (WIP) and the time it spends interacting with various tools and people, in order to make that information available in "real time" to an interested party. Without this ability to review real-time object association data, supervisors or systems have difficulty in quickly recognizing problems in a production flow.

BRIEF SUMMARY OF THE INVENTION

The illustrative embodiment of the present invention provides a method of determining and tracking object associations using a location system. Object identifiers equipped with transmitting components are linked to objects and broadcast a transmission signal which includes a unique identifier. The transmission signal broadcast by the object identifiers is received by a networked connected element interfaced with a network. The signal from the object identifier is forwarded by the networked connected element to an electronic device interfaced with the network. The location determining module analyzes a variety of data including the unique identifier, the location of all of the network connected elements receiving the signal, the receiver characteristics of the receivers of the network connected elements, and the historical location of the object in order to determine the location of the object. Once the location of the object has been determined, the location determining module consults a database to determine associations between the located object and other objects or locations based on the other objects or locations proximity to the located object. Once an association is determined, it is stored and the duration of the association is subsequently recorded.

In one embodiment of the present invention, a location system includes a network with a network connection element and is interfaced with an electronic device. The network connection element has at least one transmitting component giving it the ability to transmit and receive signals. An object identifier which is linked to an object transmits a signal bearing a unique identifier which is received by the network connection element. The network connection element appends a header to the signal and forwards it over the network to the electronic device. The system also includes a database which is interfaced with the network and which is used to store object associations. The object associations record the interaction of objects and locations that are located within a defined distance of other objects and locations. A location determining module is also interfaced with the network and uses the unique identifier sent to the electronic device and the location of the network connected element receiving the signal to calculate the location of the object. The calculated location is checked against the stored location of other objects and predetermined locations to identify associations. Any identified associations are stored in the database.

In another embodiment, a method which utilizes a location system is practiced over a network to determine object associations. The network is interfaced with an electronic device and a network connection element. An object identifier linked to an object broadcasts a signal containing a unique identifier which is received by the network connection element. The signal is forwarded to the electronic device. A location determining module calculates the location of the object identifier and the object to which it is linked using the known location of the network connected element and the unique identifier extracted from the signal retrieved from the object identifier signal. The calculated position of the object is compared against the position of other objects and locations of interest in order to determine associations. Identified associations are stored in a database interfaced with the network. In one aspect of the invention, the associations are made available as input data to other applications executing on the network. In an additional aspect of the invention, a fixed location identifier which is not interfaced with the network is used to receive and transmit signals from the object identifier to the network connection element. The known location of the fixed location identifier and its receiver characteristics provide additional data to the location determining module which is used to determine the location of the object identifier.

BRIEF DESCRIPTION OF THE DRAWINGS

FIG. 1B depicts a block diagram of an alternate environment suitable for practicing an illustrative embodiment of the present invention not utilizing a network;

DETAILED DESCRIPTION

The illustrative embodiment of the present invention provides a method of recording object associations using a location system. Object locations are determined based on signals generated from object identifiers linked to the objects and forwarded to an electronic device interfaced with a network. The origin of the signal is calculated based on the known position of the receivers receiving the signal, the historical recorded position of the object, the characteristics of the receivers receiving the signal (i.e. the range), the strength of the received signal, the type of signal, and whether or not the signal was repeated. The location is determined by software (the location determining module) either running on, or interfaced with, the electronic device. Once the location of the object has been determined, the location determining module consults a database to determine associations between the located object and other objects or specified locations based on the other objects proximity to the located object. Once an association is determined, it is stored and the duration of the association is subsequently recorded. The identified associations may then be leveraged in a number of ways by other applications interfaced with the network, such as by being used in billing systems, inventory systems, asset management, and automatic event generation based on the identified association.

Figure 1A:
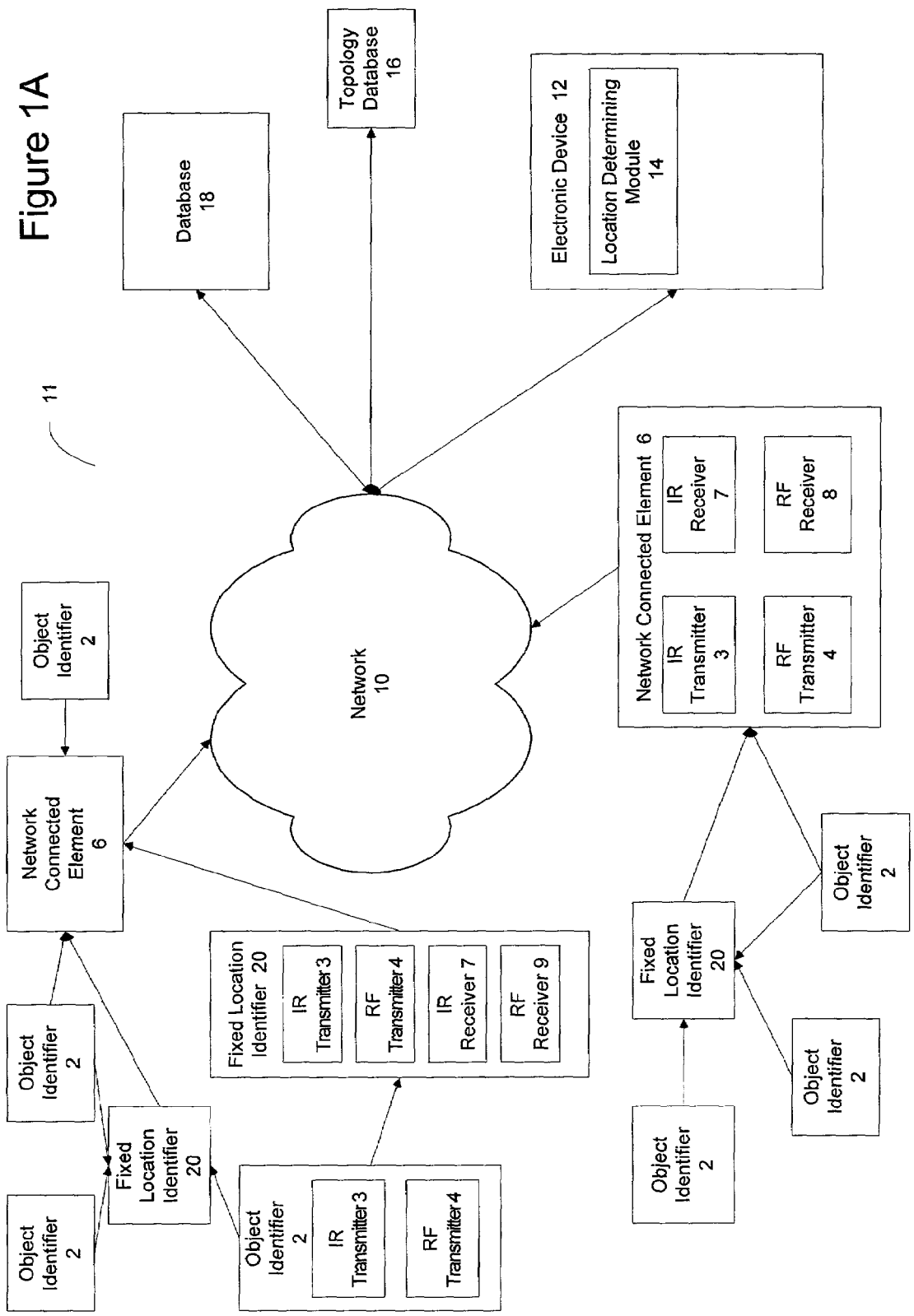
FIG. 1A depicts a block diagram of an environment suitable for practicing an illustrative embodiment of the present invention.

FIG. 1A depicts a location system 11 suitable for practicing an illustrative embodiment of the present invention. A plurality of object identifiers 2 linked to objects include an infrared (IR) transmitter 3 and a radio frequency (RF) transmitter 4 which are used to generate a signal which is sent to a network connected element 6. The signal includes a unique identifier identifying the object identifier (and by extension the object to which it is linked). The network connected element 6 includes an IR transmitter 3, an RF transmitter 4, an IR receiver 7 and an RF receiver 8. The IR receiver 7 is capable of receiving an IR signal generated by the object identifier 2. The RF receiver 8 is capable of receiving an RF signal generated by the object identifier 2. The network connected element 6 is interfaced with a network 10 and forwards the signal received from the object identifier 2 to an electronic device 12 which is also interfaced with the network 10. The interface between the network connection element 6 and the network 10 may be a physical interface in the case of a wired network, or a wireless interface in the case of a wireless network. The electronic device 12 may be a desktop computer system, PDA, handheld wireless device, laptop, web server or other device interfaced with the network 10. The network 10 may be a local area network (LAN), a wide area network (WAN), the Internet, an intranet, or a metropolitan network. The network 10 may be a wireless network such as a Bluetooth network, a cellular network, a GSM based network or some other type of network. Although the object identifier 2 and network connected element 6 have been described as including IR and RF transmitters 3 and 4 and receivers 7 and 8, those skilled in the art will recognized that other types of transmitters may be used such as ultrasound (US) either alone or in combination with the implementation depicted herein without departing from the scope of the present invention.

The electronic device 12 includes a location determining module 14 which is used to locate the object identifer 2 and the corresponding object to which the object identifier is linked. The object identifier may be directly or indirectly linked to the object. For example, the object identifier 2 may be directly linked to a person who is wearing it as a medical bracelet. Alternatively, the object identifier 2 may be indirectly linked such as by being embedded in a name tag which is fastened to clothing. As long as the object identifier 2 travels with its linked object it will identify the location of the object. Although the location determining module 14 will usually be implemented as a software component, the location determining module 14 may also be implemented by being hardwired into a device. The location determining module 14 uses the unique identifer to calculate of the current location of the object identifier. The location determining module 14 calculates the origin of the signal using a variety of factors including the known position of the receivers receiving the signal (which is retrieved from a topology database 16 which is also interfaced with the network 10), the historical recorded position of the object, the characteristics of the receivers receiving the signal (i.e. the range) (which are retrieved from a database 18 also interfaced with the network), the strength of the received signal, the type of signal, and whether or not the signal was repeated (which are determined by analyzing information contained in the signal received from the network connected element 6). Once a calculation of the location of the object identifier 2 has been made, the location of the object may be analyzed to see if it reveals object associations. The process of analyzing the calculated location of the object identifiers is described in more detail below. Any identified associations are stored in the database 18.

In one aspect of the illustrative embodiment of the present invention, a fixed location identifier 20 is also present in the location system. The fixed location identifier 20 includes an IR transmitter 3, an RF transmitter 4, an IR receiver 7 and an RF receiver 9. The IR receiver 7 is capable of receiving an IR signal generated by the object identifier 2, while the RF receiver 8 is capable of receiving an RF signal generated by the object identifier 2. The RF receiver 9 on the fixed location identifier 20 may have a shorter receiving range than the RF receiver 8 on the network connected element 6. The location of the fixed location identifier 20 is stored in the topology database 16. After receiving a signal from the object identifier 2, the fixed location identifier appends its own identifier to the signal and tranmsits it to a network connected element 6. When the signal eventually reaches the location determining module 14, the location determining module uses the range characteristic of the fixed location identifier 20 to help locate the object identifier 2. In other words, if the location determining module receives notification from both a fixed location identifier 20 and a network connection element 6 that both have received an RF signal, the signal can only have originated from a spot that is within both receivers receiving range. Those skilled in the art will recognize that many alternate implementations are possible within the scope of the present invention. The object identifier 2 may use different types and combinations of transmitting components. Similarly, the object identifier may include a receiving component. The location determining module 14 may appear in any of a number of locations including being located on the object identifier 2 and is not limited to being stored on the electronic device 12. In one embodiment of the present invention, the signals may be bi-directional and travel in both directions between the network 10 and the object identifier 2.

A non-networked form of the illustrative embodiment of the present invention may also be implemented. FIG. 1B depicts a block diagram of location system 11 suitable for determining object association without relying on the use of a network. An object identifier 2 transmits a signal directly to the location resolving module 14 which in this implementation includes stored data allowing it to associate objects and locations. The object identifier 2 transmits the signal using a transmitting component to transmit a signal. The transmitting component may be a transmsitter, transceiver, transponder or similar device. Those skilled in the art will recognize that different types of components capable of transmitting and receiving signals may be used in place of the illustrated transmitters and receivers depicted herein. For example, a transceiver may be substituted for a receiver without departing from the scope of the present invention. The location determining module 14 may include any structure suitable for determining location. Examples include any device with intelligence to determine the location of one or more object identifiers. According to various embodiments of the invention, the location determining module 14 may be an electronic device. The electronic device may take multiple forms and may include, a processor, a computer, a personal digital assistant, a communications device, such as a cell phone, a network appliance, a web server, a network, any device capable of manipulating information, a receiver, a transmitter, an interface or any combination of these devices.

According to various embodiments of the invention, the location determining module 14 may be capable of performing additional functionality, such as receiving requests for information, providing information, storing information, commanding actions in response to location information, associating objects with other objects or with locations, establishing privacy conditions regarding availability of location information, interfacing directly with various network types, and the like. According to further embodiments of the invention, the location determining module 14 includes multiple, distributed receivers, some of which may be connected to a network, and others not connected to a network. According to various embodiments of the invention, the object identifier 10 and location determining module 14 utilize both RF signals and IR signals for the determination of location.

Figure 2B:
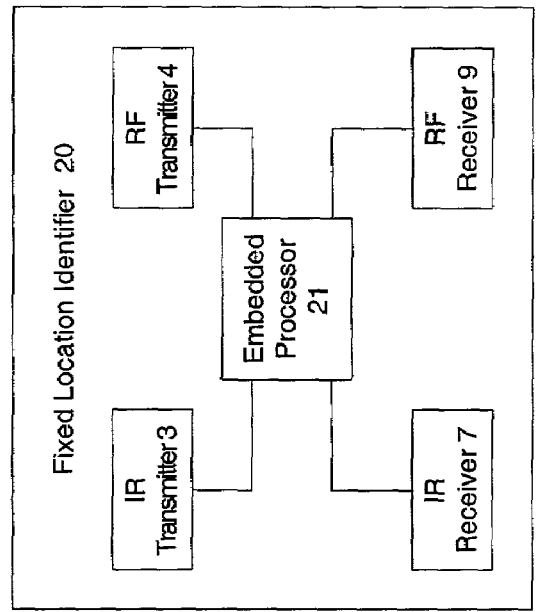
FIG. 2B depicts a block diagram of a fixed location identifier used by the illustrative embodiment of the present invention.
Figure 2A:
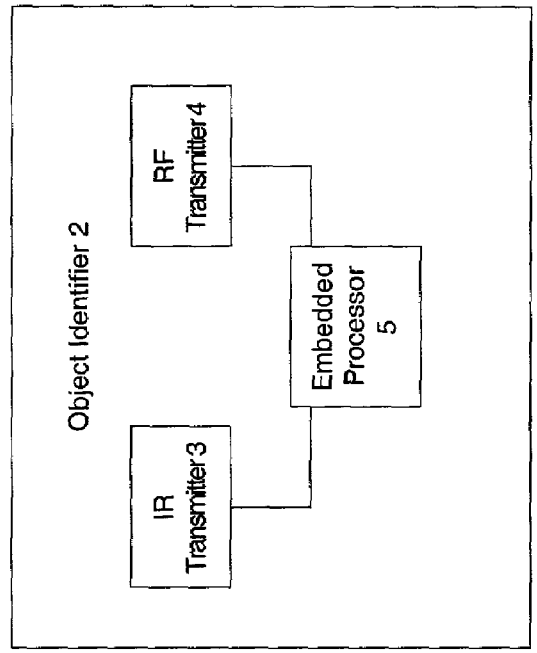
FIG. 2A depicts a block diagram of an object identifier used by the illustrative embodiment of the present invention.

FIG. 2A depicts a block diagram of an object identifier 2 used by the illustrative embodiment of the present invention. The object identifier 2 includes an IR transmitter 3 and an RF transmitter 4. Both transmitters are controlled by an embedded processer 5 which controls the signaling process. Similarly, FIG. 2B depicts a block diagram of a fixed location identifier 20 used by the illustrative embodiment of the present invention. The fixed location identifier 20 includes an IR transmitter 3 and an RF transmitter 4 which are controlled by an embedded processer 5 which controls the signaling process. Also included in the fixed location identifier 20 are an IR receiver 7 and an RF receiver 9 which are used to receive signals from the object identifier 2.

The signaling process may make use of both RF and IR signals in alternating combination. According to one embodiment of the invention the RF signal is transmitted every ten seconds and the IR signal is transmitted every twenty seconds. This method provides a substantially consistent IR power level, while varying an RF power level. Varying the RF power level may assist in determining a location of the object identifier 2 by enabling the network connection element 6 to receive less than all of the RF signals. The transmitted signals may also include additional information such as the signal strength being transmitted, the period between transmissions, the length of time of the transmissions, a unique identifier for the object identifier 2, information received from one or more input devices and/or various status information, such as those pertaining to the components of the object identifier. In one aspect of the invention, the object identifier 2 also contains receivers and the location determining module 14 configures the object identifier over the network 10 by sending transmission parameters (i.e.: alternate signals every 30 seconds). Since IR signals are line-of-sight signals and RF signals travel through walls, the combination of signals may be used by the illustrative embodiment of the present invention to locate signals with greater accuracy than would be possible using either form of signaling alone.

Figure 3:
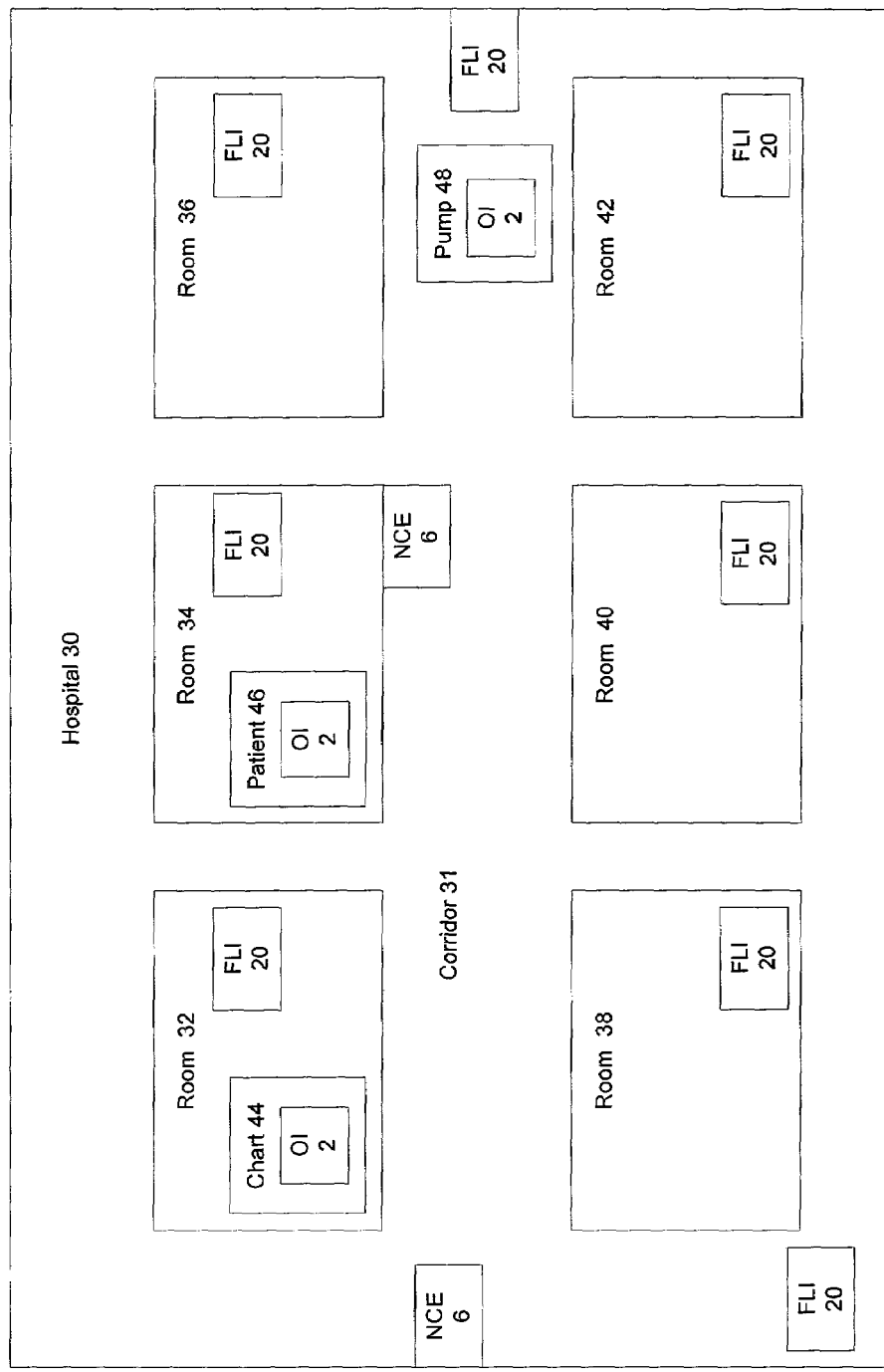
FIG. 3 depicts a block diagram of the layout of a hospital practicing an illustrative embodiment of the present invention.

FIG. 3 depicts a block diagram of a layout of a hospital 30 using the illustrative embodiment of the present invention. The hospital 30 includes a plurality of rooms 32, 34, 36, 38, 40 and 42. Each of the rooms 32, 34, 36, 38, 40 and 42 has a fixed location identifier within the room. A corridor 31 has an additional fixed location identifier at one end of the corridor and a couple of network connected elements 6 located in the middle of the corridor and end of the corridor. As previously noted, the network 10 to which the network connected element 6 is connected may be a wired or wireless network with the result that the network connected element 6 may or may not be physically connected to the network. The illustrative embodiment of the present invention is designed to execute over pre-existing networks and does not require the creation of a proprietary network. The hospital includes a plurality of objects to which object identifier's 2 have been linked. One room 32 includes a patient chart 44 with an object identifier 2 attached to the chart so that it will not be misplaced and may be quickly retrieved. Another room 34 includes a patient 46 who is wearing an object identifier 2 either attached to a piece of clothing or as a bracelet. The object identifier attached to the patient 2 allows the patient's movements to be tracked throughout the hospital. Out in the corridor 31, an object identifier 2 is linked to an infusion pump 48. The object identifier 2 allows quick location of the infusion pump 48 in the event another unit of the hospital borrows the pump in an emergency without time to inform the proper people working in the hospital unit to which the pump is assigned.

The use of the network connected elements 6 and the fixed location identifiers 20 may be illustrated with an example. The object identifier 2 linked to the infusion pump 48 may be configured to emit alternating IR signals and RF signals bearing a unique identifier. If the infusion pump 48 is located in a corridor 31 the RF signal (which may travel through walls) may be picked up by receivers located on the fixed location identifiers 20 in a number of rooms 34, 36, 40 and 42 as well as the fixed location identifier at the end of the corridor nearest to the pump. Additionally, the signal may also be received by the network connected element 6 located outside room 34. The alternating IR signal emitted by the object identifier 2 linked to the infusion pump 48 is received by only the fixed location identifier 20 located at the end of the corridor and the network connected element 6 located outside room 34 since IR signals are line-of-sight signals. Since line-of-sight signals do not travel through walls well, they are unlikely to be received by an IR receiver located within one of the hospital rooms 32, 34, 36, 38, 40 and 42. The network connected element 6 located outside room 34 and the fixed location identifier 20 located at the end of the corridor will report receiving both signals to the location determining module 14. The location determining module 14 will use the known location of both the network connected element 6 outside room 34 and the fixed location identifier 20 at the end of the corridor to determine that since both receivers received both types of signal, the infusion pump 48 must be in the corridor 31. Furthermore, since the fixed location identifier 20 has a smaller receiving range for RF signals than does the receiver for the network connected element 6, the infusion pump 48 must be located not only in the corridor but within range of the RF receiver 9 on the fixed location identifier 20. In one embodiment, the fixed location identifier might have a receiving range for RF signals of 6 feet (as opposed to a 20 foot receiving range for the RF receiver 8 for the network connected element 6 outside room 34) which would allow the infusion pump to be located to within 6 feet of the fixed location identifier in the corridor 31. The actual receiving ranges of the RF receivers 8 and 9 are an implementation choice, and those skilled in the art will recognize that they may be adjusted without departing from the scope of the present invention.

Once the location determining module 14 has determined the current location of an object to which an object identifier 2 is linked, the location is compared against the current location of other objects and pre-determined locations to determine the proximity of the located object to the other objects or the pre-determined location. The pre-determined location is usually a place of special interest such as a bed. If the object is within a pre-defined distance of another object or pre-determined location, the location determining module 14 determines the two objects (or the object and the pre-determined location) are interacting and records an association in the database 18. Depending upon the implementation, the location determining module 14 may require the association to occur for a minimum period of time before deciding an association is occurring. The association is tracked for beginning time, ending time, duration and alternately for separate occurrences, all of which may be stored in the database 18. The electronic device 2 holds, or is interfaced with a variety of software programs to make use of the object associations determined by the location determining module 14.

Figure 4:
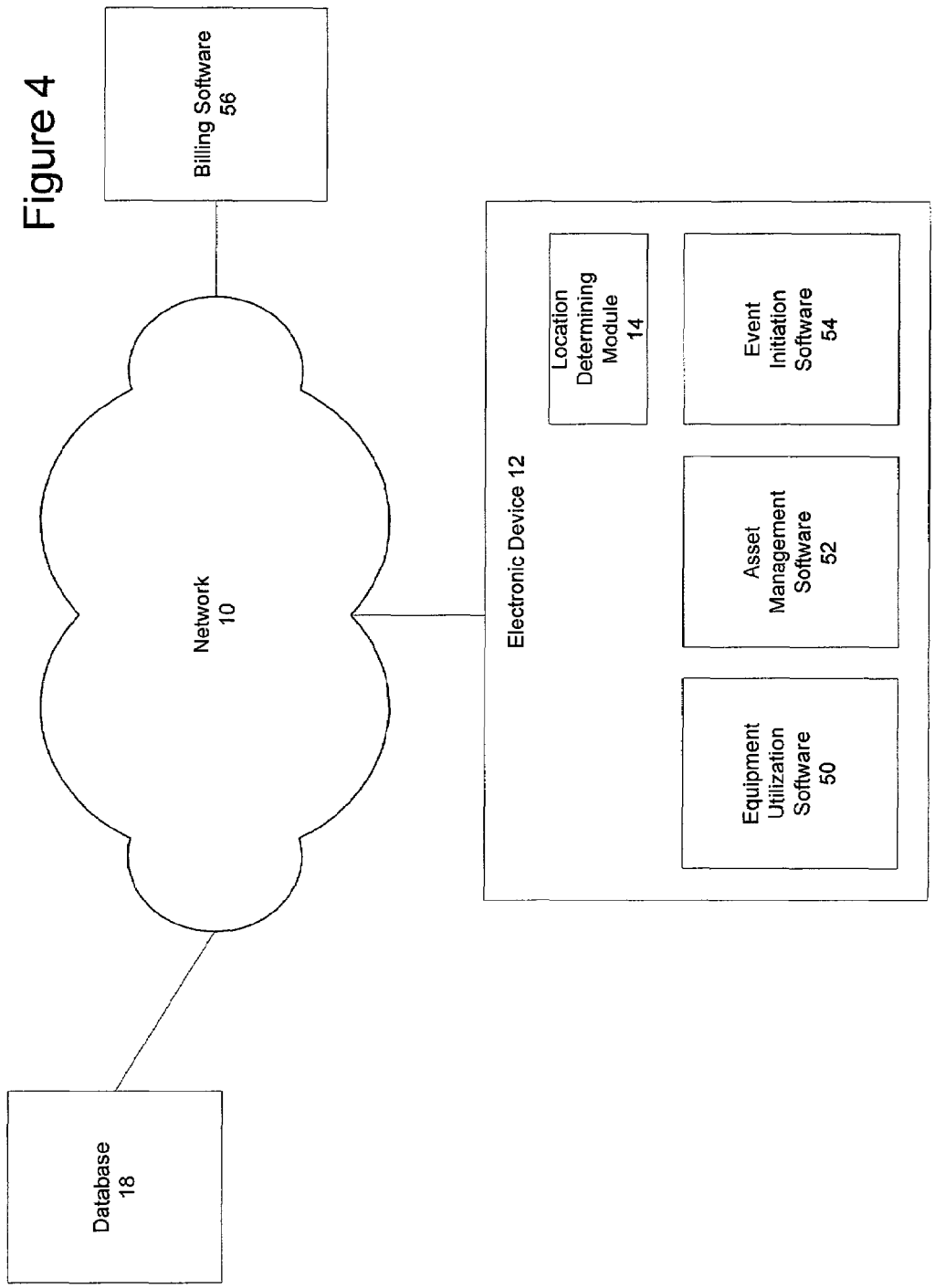
FIG. 4 depicts a block diagram of components of the illustrative embodiment of the present invention used to analyze the associations determined by the location determining module.

FIG. 4 depicts a block diagram of components of the illustrative embodiment of the present invention used to analyze the associations determined by the location determining module 14. The location determining module 14 determines object associations and stores records of those associations in the database 18. A variety of software components accessible to the location determining module may be used to analyze the object associations. Equipment utilization software 50, asset management software 52 and event initiation software 54 are stored on the electronic device 12. Billing software 56 is interfaced with the network 10. Examples of the different types of software used to analyze object associations determined by the location determining module 14 are explored in more detail below. The software may utilize a JDBC interface located in the location determining module 14 which allows Java applications to send SQL commands to the database 18. Those skilled in the art will recognize that the location of the various software components utilizing the object associations as input data may change without departing from the scope of the present invention.

Figure 5:
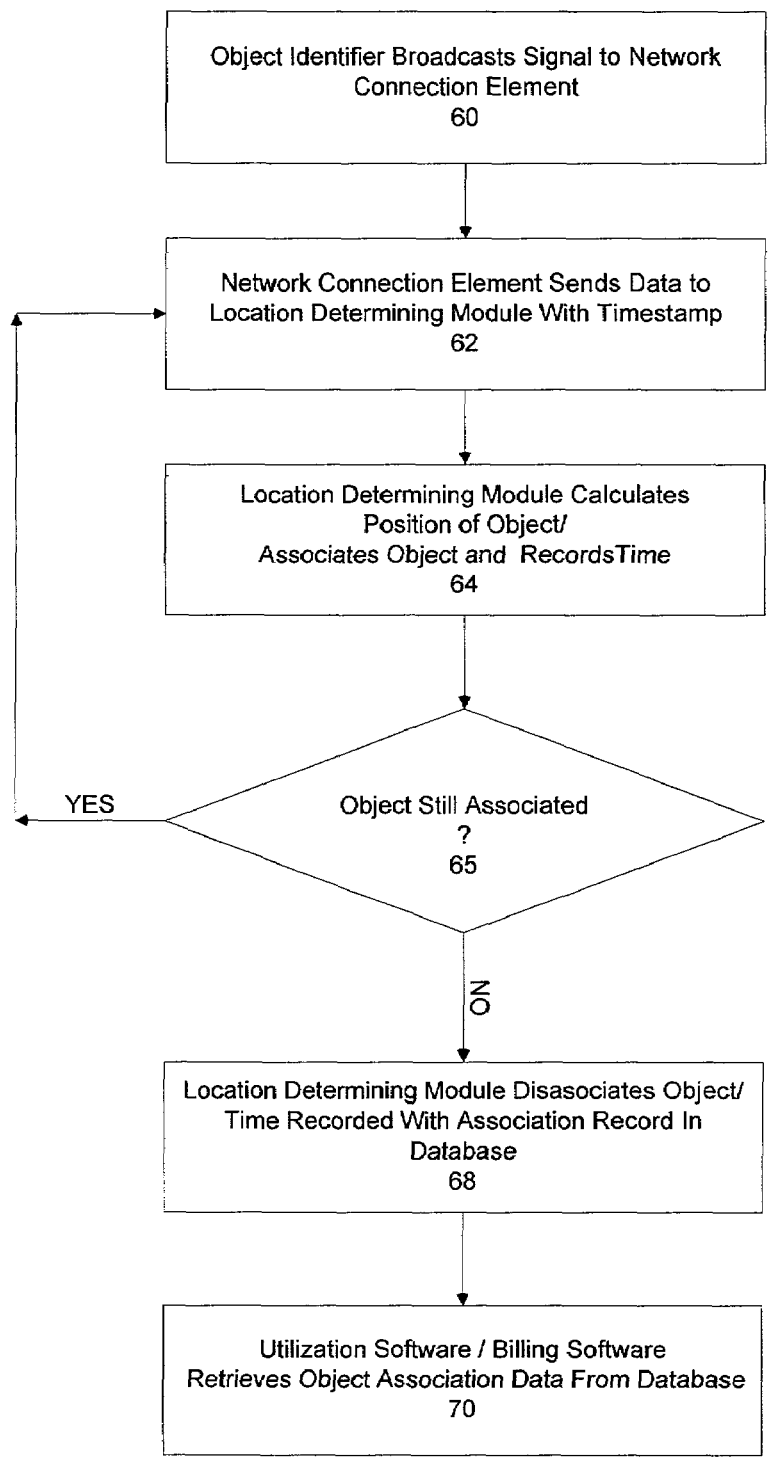
FIG. 5 is a flowchart of the sequence of steps followed by the illustrative embodiment of the present invention to perform equipment utilization analysis and bill generation as a result of object association determined by the illustrative embodiment of the present invention.

Once the object associations have been determined by the location determining module 14, the records of the associations may be provided as input data to a variety of software programs. FIG. 5 is a flowchart of the sequence of steps performed by the illustrative embodiment of the present invention to determine object associations and utilize them in equipment utilization and billing software 50 and 56. The sequence begins when an object identifier 2 linked to an object broadcasts a signal to the network connected element 6 (step 60). The signal may be forwarded from a fixed location identifier 20 to the network connected element 6. The network connected element 6 appends a time stamp and its identifier onto the signal and sends it to the electronic device 2 and location determining module 14 (step 62). The location determining module 14 calculates the position of the object as outlined above, associates the located object with another object or a predetermined location and records the association and the time the association began in the database 18 (step 64). The network connected element 6 sends signals received from the object identifier 2 and/or from the fixed location identifier 20 until the association is finished (step 66). Once the network connected element 6 stops sending signals, the location determining module 14 disassociates the object in the database 18 and records the time the association ended (step 68). The database 18 holds the records of the association which may then be retrieved by the equipment utilization software or billing software 50 and 56 (step 70). The equipment utilization software 50 may use the data to analyze how often a portable x-ray machine is being used in a particular department of a hospital. Alternatively, the object association data may indicate how often a room is being utilized. Similarly, the billing software 56 may use the object association data to determine how much time a surgeon spent in an operating room with a patient in order to determine the amount to bill the patient.

The illustrative embodiment of the present invention may leverage the object association data in a number of ways. In one embodiment, the determined object associations are used to track the movements of a contagious patient in a health care facility. By mapping the calculated locations indicating the individual's path of travel, the health care facility is able to create a response based on which patients were probably exposed to the contagion. In another embodiment, object identifiers may be linked to prescription drugs. For example, when a bag of intravenous drugs linked to an object identifier forms an association with a patient, a database may be consulted to prevent adverse reactions based on other drugs already received by the patient and/or the patients personal medical history indicating allergies. In another embodiment, the object associations may be used to ensure compliance with HIPPA, the Health Insurance Privacy and Portability Act, which requires that access to a patient's records be limited. By linking object identifiers 2 to staff and the patient's chart, a record may be created indicating who viewed the chart.

Figure 6:
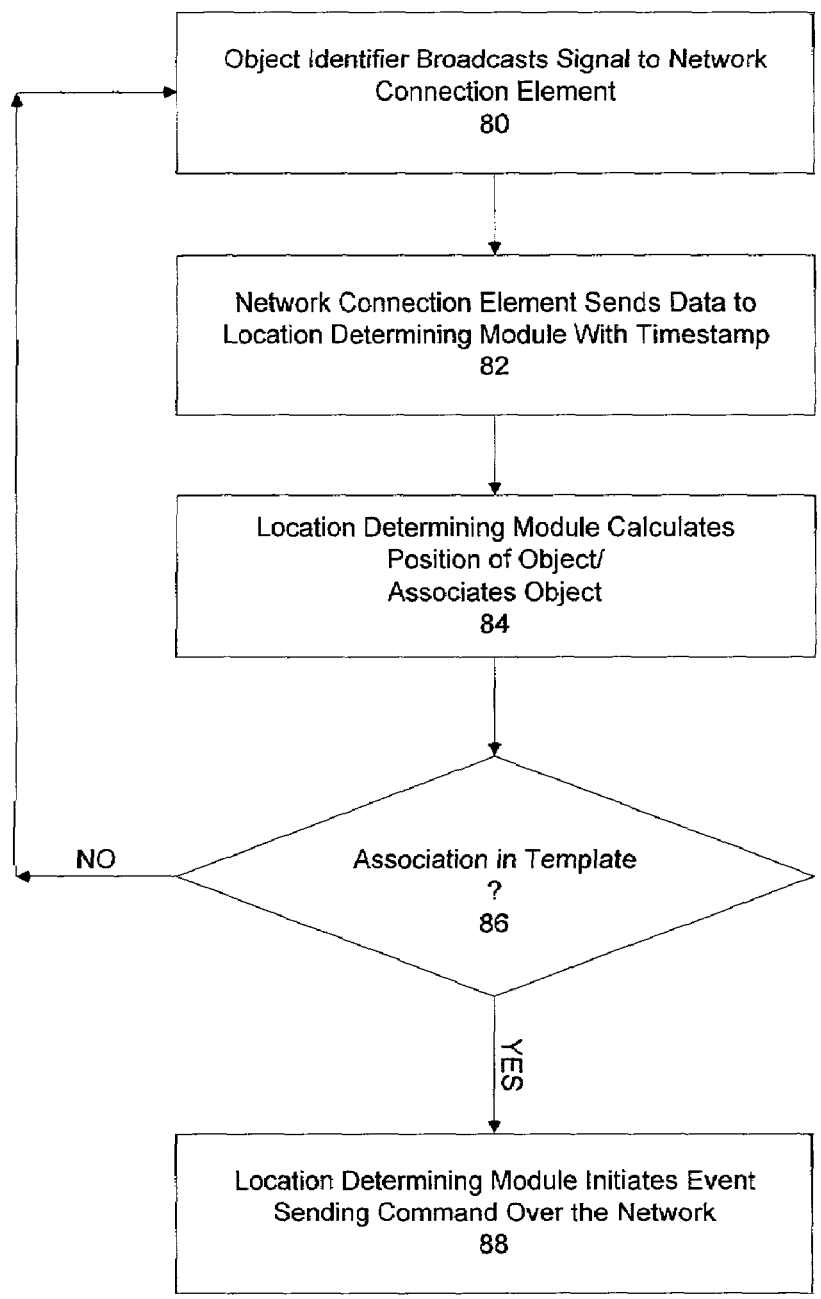
FIG. 6 is a flowchart of the sequence of steps followed by the illustrative embodiment of the present invention to perform event initiation as a result of object association determined by the illustrative embodiment of the present invention.

The object association data held in the database 18 may also be used for event initiation. FIG. 6 is a flowchart of the sequence of steps performed by the illustrative embodiment of the present invention to determine object associations and utilize them in event initiation software 54. The sequence begins when an object identifier 2 linked to an object broadcasts a signal to the network connected element 6 (step 80). The signal may be forwarded from a fixed location identifier 20 to the network connected element 6. The network connected element 6 appends a time stamp and its identifier onto the signal and sends it to the electronic device 2 and location determining module 14 (step 82). The location determining module 14 calculates the position of the object as outlined above, associates the located object with another object or a predetermined location and records the association in the database (step 84). The association may then be programmatically compared against a template of associations by the event initiation software 54 (step 86). For example, the event initiation software 54 may indicate that if a hospital patient object identifier associates with a corridor, an alarm should be sounded at the nursing station in the applicable hospital unit. Alternately, the event initiation software may indicate that if the object identifier embedded in the name badge of a company CEO becomes associated with an entryway a greeting may be broadcast. If the association is listed in the template, instructions for the event are broadcast on the network 10 (step 88). Those skilled in the art will recognize that other forms of analyzing an object association besides a template may be used without departing from the scope of the present invention.

In one embodiment of the present invention, the object association data is utilized by asset management software 52. Asset management software may be used to provide a real-time inventory of assets owned by a company. The ability to quickly locate items may be of paramount importance in industries such as the health care industry, where a failure to locate an item quickly can result in catastrophic consequences. Additionally, the constant updating of asset locations may result in much lower costs during end of the year inventories. The frequency with which assets transmit their positions is configurable and may be based on how frequently the item is likely to move. For example, for larger machines that move infrequently, the transmitters may be set to signal once an hour or once a day. For smaller items, or items that are frequently being moved, the transmitters may be set to signal once a minute or once every 10 seconds in the case of an object identifier linked to a person. The real-time position of assets may then be broadcast on the network 10 and made available to authorized individuals. In another embodiment, an association may be formed between a bedridden patient and a bed. If it is determined that the association has stopped, an alert is sent over the network to a nurses station to indicate the possibility that the patient has fallen out of bed.

Although many of the examples listed herein have been made with reference to a hospital environment, the illustrative embodiment of the present invention may be used to detect object associations in a variety of environments. For instance, the object association may take place in the setting of an airport where bags are associated with machinery designated to divert the bags to specific destinations. Alternatively, the object association may be used to verify that each checked bag is associated with a seated passenger before a plane takes off from an airport. The object association may be used to track the movements of products in a store or utilized at a check out register. The object association may be used to identify the effectiveness, or lack thereof, of advertising displays. Since the object association system is designed to work with components which utilize existing network topology, object associations may be determined in many different environments and the environments listed herein are intended merely as illustrative examples and not as an exhaustive list.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. Practitioners of the art will realize that the sequence of steps depicted in the figures may be altered without departing from the scope of the present invention and that the illustrations contained herein are singular examples of a multitude of possible depictions of the present invention.

I claim:

1. A location system including a network with a network connected element and electronic device interfaced thereto, said network connected element including at least one signaling component capable of transmitting signals, and at least one receiving component capable of receiving signals, comprising:

an object identifier, said object identifier being a device linked to an object, said object identifier having at least one transmitting component, said transmitting component generating a signal with a unique identifier, said signal received by said network connected element and incorporated into a second signal, having an identifier of the network connected element, transmitted from said network connected element to said electronic device;

a database holding object associations, said associations being the interaction of an object with at least one of another object and a location, said interaction occurring when said object is within a defined distance of at least one of another object and a location; and a location determining module interfaced with said network, said location determining module using said unique identifier to programmatically calculate the location of said object identifier and the object to which the object identifier is linked, said calculated location of said object being used to determine an association between said object and at least one of another object and a location, said determined association being stored in said database.

2. The system of claim 1 wherein said object identifier includes a receiving component, said receiving component receiving signals transmitted from said network connected element.

3. The system of claim 1, comprising further:
a topology database holding the locations of a plurality of network connected elements; said locations used by said software facility in calculating the location of said object identifier.

4. The system of claim 1, comprising further:
a fixed location identifier not interfaced with said network, said fixed location identifier including at least one receiving component receiving transmissions from said object identifier, said receiving component having a different receiving range than the receiving component for said network connected element, and at least one transmitting component transmitting a signal to said network connected element, said network connected element incorporating the signal from the fixed location identifier into a signal sent to said electronic device, said location determining module using the receiving range of the receiving component of said fixed location identifier, the receiving range of the receiving component of said network connected element, and a known location of said fixed location identifier in the calculation of said object identifier location.

5. The system of claim 4 wherein said network is located in a health care facility.

6. The system of claim 1 further comprising:
at least one of an application and process interfaced with said network, said applications and processes using said object association as input data.

7. The system of claim 6 wherein said at least one of an application and process uses said object association data to ensure regulatory compliance of a health care facility with HIPPA (the Health Insurance and Patient Privacy Act), said compliance demonstrated by recording the associations between located persons and health care records.

8. The system of claim 6 wherein said at least one of an application and process uses said object association data to analyze room utilization in a health care facility by recording associations between a room and at least one of an object and person.

9. The system of claim 6 wherein said at least one of an application and process uses said object association data to track associations between medical patients and prescribed drugs, said associations programmatically triggering an alarm upon matching a previously designated association stored in said database.

10. The system of claim 1, wherein said object identifier includes a receiving component and said location determining module is located on said object identifier.

11. The system of claim 1, wherein said object identifier includes a receiving component and is interfaced with said network.

12. In a location system, said location system including a network with an electronic device and a network connected element interfaced thereto, said network connected element including at least one signaling component capable of transmitting signals, and at least one receiving component capable of receiving signals, a method, comprising the steps of:

providing an object identifier linked to an object, said object identifier being a device having at least one transmitting component, said transmitting component generating a signal with a unique identifier, said signal received by said network connected element;

transmitting a second signal from said network connected element to said electronic device, said second signal incorporating said signal from said object identifier and an identifier of the network connected element;

calculating programmatically the location of said object identifier and said object to which it is linked using said unique identifier and the location of said network connected element; and recording associations in a database interfaced with said network, said associations being the interaction of an object with at least one of another object and a location, said interaction occurring when the calculated location of said object is within a defined distance of at least one of another object and a location.

13. The method of claim 12 wherein the duration of an association is stored in said database.

14. The method of claim 12 wherein recurrent occurrences of an association are stored in said database.

15. The method of claim 12 wherein the association stored in said database is between at least one of a physical object and a person and at least one of a physical object and a person.

16. The method of claim 15 wherein said network is located in a health care facility.

17. The method of claim 12, comprising the further steps of:
linking said object identifier to medical equipment;
linking a second object identifier to a person;
recording an association between said person and said medical equipment;
recording the duration of the association between said person and said medical equipment, and
generating programmatically a bill for use of said medical equipment based upon the duration of said association.

18. The method of claim 12, comprising the further steps of:
linking said object identifier to medical equipment;
recording the cumulative duration of associations between said medical equipment and a plurality of other object identifiers linked to other objects, said cumulative duration indicating the amount of time said piece of medical equipment was in use during a predetermined time period; and
analyzing programmatically the utilization of said medical equipment based on said cumulative duration.

19. The method of claim 12, comprising the further steps of:
affixing said object identifier to a medical patient;
affixing a second object identifier to a health care professional;
recording an association between said medical patient and said health care professional;
recording the duration of the association between said medical patient and said health care professional; and generating programmatically a bill for the services of said health care professional based upon the duration of said association between said medical patient and said health care professional.

20. The method of claim 12, comprising the further steps of:
   affixing said object identifier to a medical patient;
   recording an association between said medical patient and a location; and
   generating an event with said electronic device based upon the determined location of said patient.

21. The method of claim 20 wherein said event is an audible alarm at a designated location.

22. The method of claim 20 wherein said event is an email notification of the location of the patient sent to a designated person.

23. The method of claim 20 wherein said event is the transmission of an instruction over said network to alter the security of an access way.

24. The method of claim 12, comprising the further steps of:
   linking said object identifier to medical equipment;
   updating periodically in said database the location of said medical equipment; and
   providing the location of said medical equipment to a user of said electronic device upon request.

25. The method of claim 12 wherein the signal generated by said object identifier is at least one of an ultrasound (US), signal an infrared (IR) signal and a radio frequency (RF) signal.

26. The method of claim 12 wherein the signal generated by said object identifier is at least two of an ultrasound (US), signal an infrared (IR) signal and a radio frequency (RF) signal.

27. The method of claim 12, comprising the steps of:
   transmitting an IR signal from said object identifier;
   transmitting an RF signal from said object identifier;
   periodically alternating the transmitting of said IR signal and said RF signal;
   calculating the location of the object to which said object identifier is linked based upon the received signal characteristics of said IR signal and said RF signal.

28. The method of claim 12 wherein said network is a wireless network.

29. The method of claim 12 wherein said network is the Internet.

30. The method of claim 12, comprising the further steps of:
   linking said object identifier to a person;
   recording an association between said person and a location; and
   generating an event with said electronic device based upon the determined location of said person.

31. The method of claim 12 comprising the further steps of:
   providing a fixed location identifier not interfaced with said network, said fixed location identifier including a receiving component, said receiving component having a different receiving range than the receiver for said network connected element, and a signaling component;
   receiving said signal from said object identifier with said fixed location identifier;
   transmitting an additional signal from said fixed location identifier to said network connected element, said additional signal incorporating said signal from said object identifier and an identifier of the fixed location identifier; and
   calculating programmatically the location of said object identifier and the corresponding object to which it is linked using the receiving range of the receiver of said fixed location identifier and the receiving range of the receiver of said network connected element in the calculation.

32. The method of claim 12 wherein said object identifier includes a receiving component.

33. The method of claim 32, comprising the further step of:
   configuring the generation of signals sent by said object identifier by sending instructions from said electronic device to said object identifier over said network.

34. The method of claim 12, comprising the further steps of:
   identifying the location of the entry into a health care facility of an individual with an infectious contagion; and
   tracking the movements of said individual throughout said health care facility.

35. In a location system, said location system including a network with an electronic device and a network connected element interfaced thereto, said network connected element including a receiving component and a signaling component, a medium holding computer-executable steps for a method, comprising the steps of:
   transmitting a signal from an object identifier linked to an object, said signal having a unique identifier, said signal received by said network connected element and incorporated into a second signal, having an identifier of the network connected element, broadcast on said network;
   calculating programmatically the location of said object identifier and an object to which it is linked using said unique identifier and a known location of said network connected element; and
   recording associations in a database interfaced, with said network, said associations being the interaction of said object with at least one of another object and a location, said interaction occurring when the calculated location of said object is within a defined distance of at least one of another object and a location.

36. The medium of claim 35 wherein said object associations recorded in said database are accessible to a plurality of software applications interfaced with said network.

* * * * *